March 28, 1967 W. A. DUDLEY 3,311,127
GAS LIFT VALVE HAVING PARTICULAR PISTON SEAL
Filed Aug. 31, 1964 3 Sheets-Sheet 1

William A. Dudley
INVENTOR.

ATTORNEYS

March 28, 1967 W. A. DUDLEY 3,311,127
GAS LIFT VALVE HAVING PARTICULAR PISTON SEAL
Filed Aug. 31, 1964 3 Sheets-Sheet 2

William A. Dudley
INVENTOR.

BY

ATTORNEYS

March 28, 1967  W. A. DUDLEY  3,311,127
GAS LIFT VALVE HAVING PARTICULAR PISTON SEAL
Filed Aug. 31, 1964  3 Sheets-Sheet 3
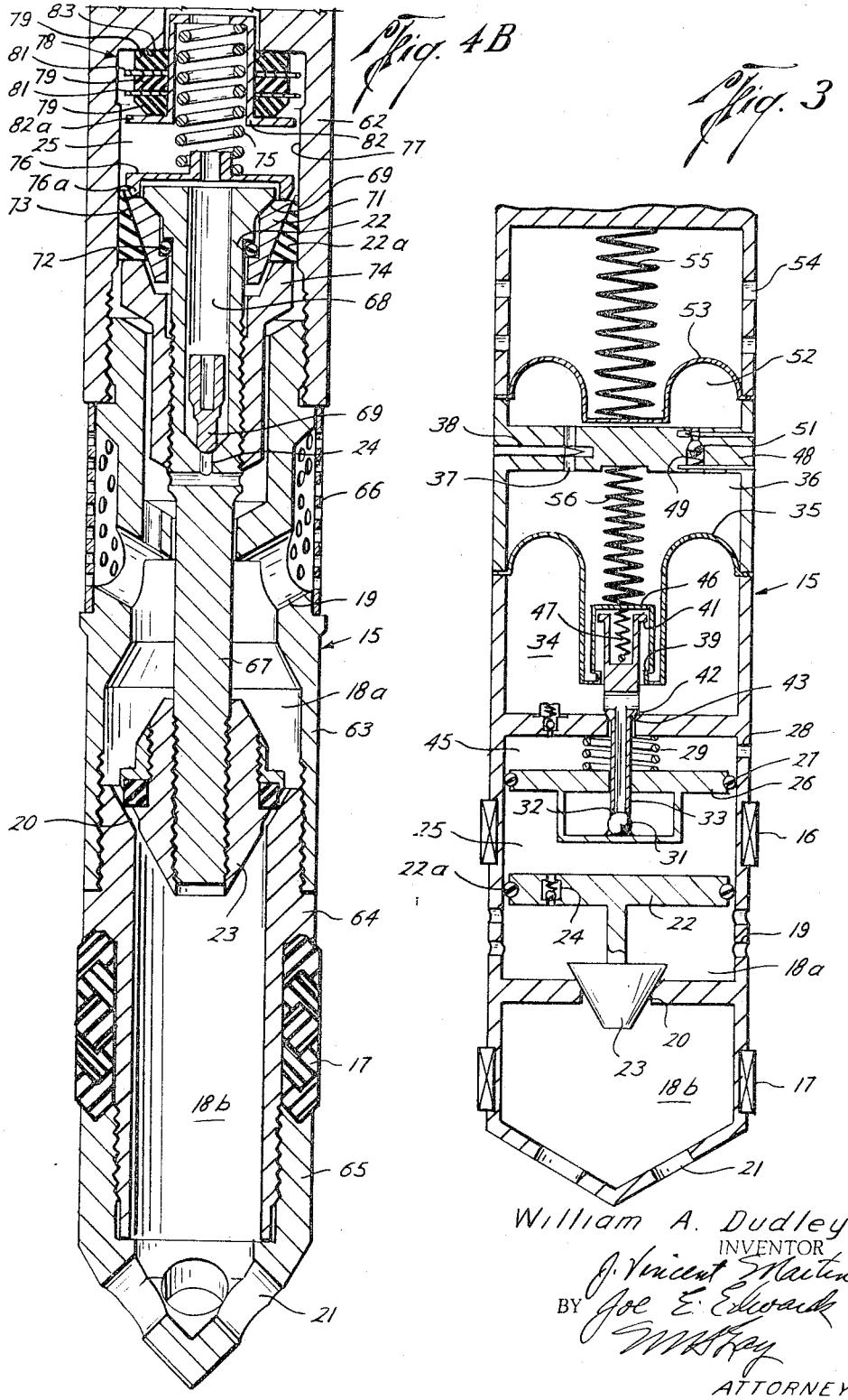
William A. Dudley
INVENTOR
BY
ATTORNEYS 3,311,127
GAS LIFT VALVE HAVING PARTICULAR
PISTON SEAL
William A. Dudley, Dallas, Tex., assignor to Merla Tool
Corporation, Garland, Tex., a corporation of Texas
Filed Aug. 31, 1964, Ser. No. 393,179
2 Claims. (Cl. 137—155)

This invention relates to valves, and more particularly to gas lift valves.

In the Lamb and Dudley application Ser. No. 170,593, now abandoned, there is shown a motor piston for operating the main valve of a pilot-operated valve which employs a wedge-like Teflon seal. This seal is a one-way seal and will not seal in both directions.

It is an object of this invention to improve the seal assembly of said Lamb and Dudley application to provide a motor piston having a seal assembly with all of the advantages of the Lamb and Dudley seal assembly plus the capability of sealing against a differential in either direction across the motor piston.

It is a further object to so design the motor piston of the Lamb and Dudley application so that it will not only seal against a differential in both directions, but a spring used in the assembly will perform the triple function of holding the movable parts of the motor piston in sealing relation, holding the bumper assembly in position, and urging the main valve toward its seat.

Other objects, features and advantages of the invention will be apparent from the drawings, the specification and the claims.

In the drawings, wherein an illustrative embodiment of this invention is shown, and wherein like reference numerals indicate like parts:

FIGURE 3 is a schematic view of a valve embodying this invention;

FIGURES 4A and 4B are views in vertical cross-section through a valve constructed in accordance with this invention, with FIGURE 4B being a continuation of FIGURE 4A and the topmost section of the valve omitted.

Figure 1:
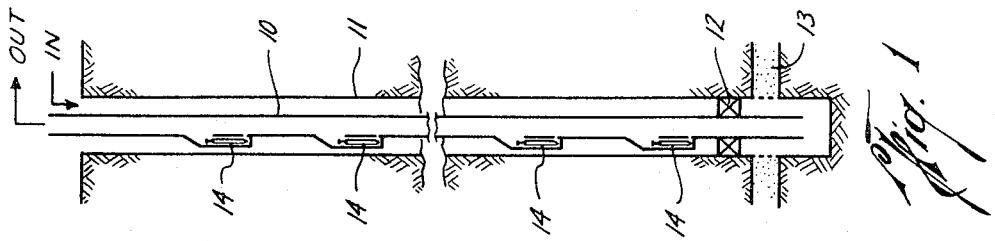
FIGURE 1 is a sectional view through a well system employing a plurality of valves constructed in accordance with this invention.
Figure 5:
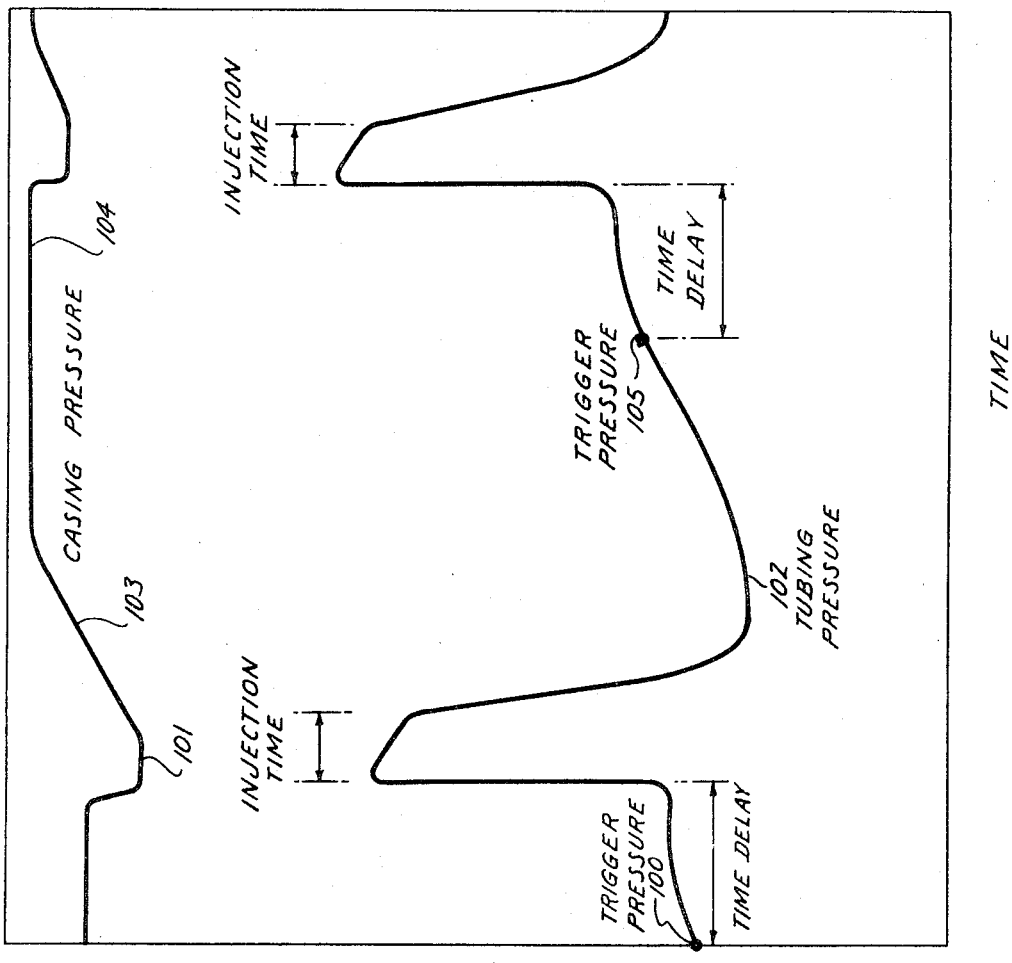
FIGURE 5 is a graph illustrating the operation of the valve shown in the drawings.

In accordance with this invention, a system is provided such as shown in FIGURE 1 in which all surface timing controls may be omitted. The tubing 10 is run within the casing 11 and a packer 12 may be set in the casing-tubing annulus above the producing formation 13. A plurality of valves 14 are provided in the tubing. While the illustrated valves are of the wireline type, it will be understood that they may be placed in the well at any time and in any desired manner.

Each valve is tubing sensitive and includes a mechanism which opens the valve when the tubing pressure is a selected value below casing pressure. If tubing pressure is greater than casing pressure, the valve will be closed. After a valve opens, a timing mechanism controls the time during which the valve remains open. The main valve opens and closes with a snap action.

The well will be unloaded in the conventional manner by U-tubing fluid through the several gas-lift valves beginning with the upper valve and proceeding succesively down the string of valves.

While these valves may be utilized as working valves and other valves utilized as unloading valves, it is preferred that valves of the instant invention be utilized at all depths where working valves are required.

As well known to those skilled in the art, a well may produce through several progressively lower positioned valves during its life, and the production valves should preferably be valves constructed in accordance with this invention so that all production will be timed down in the well.

Reference is now made to FIGURE 3 which shows schematically the principle of operation of the illustrative form of valve. The valve includes a housing 15 having spaced seals 16 and 17 which are adapted to sealingly engage a side pocket mandrel of the form shown in FIGURE 2. The valve includes a passageway provided by chambers 18a and 18b and when the valve is open, gas enters through inlets 19 at the beginning of the passageway and exists through outlets 21 at the end of the pasageway in the conventional manner.

The valve is shown as a pilot-operated valve, and a motor 22 is provided for controlling movement of the valve member 23 toward and away from its seat 20 in the conventional manner. The motor piston 22 is provided with a sliding seal 22a engaging the wall of the housing. Casing gas passes upwardly through the back-check valve passageway 24 and into the chamber 25. From the explanation thus far given, it will be appreciated that when the main valve 23 is closed the motor piston is subjected to casing pressure on both sides as is conventional with many pilot-operated valves. The back-check passageway 24 provides a bleed or restricted flow path and, when the pressure in chamber 25 is reduced, the main valve opens. Upon the pressure in chamber 25 returning to casing pressure, the main valve will again close. This form of operation of the main valve member and motor piston is well known in the pilot valve art.

In order to provide trigger operation of the timing cycle and opening of the main valve for a specified length of time, there is provided a pressure-responsive member which may take the form of piston 26 provided with an O-ring 27 slidably engaged with housing 15. Above the uppermost packing 16, and thus exposed to tubing pressure, is a port 28. This port exposes the upper surface of the piston 26 to tubing pressure. Thus, the piston 26 is exposed on its upper surface to tubing pressure and on its lower surface to casing pressure. When the combined force exerted by tubing pressure and spring 29 on the piston 16 exceeds the force exerted by casing pressure in chamber 25, the piston 26 moves downwardly and triggers the beginning of the cycle by unseating ball valve 31 from its seat 32 on the lower end of communicator tube 33.

Upon unseating of ball 31 there begins a sensing cycle in which the valve senses whether or not the signal in the tubing is cause by a head of fluid above the valve or by a false signal. An example of a false signal would be a slug of liquid being lifted through the tubing by gas injected through a lower valve. Where a false signal is received, the main valve 23 remains closed.

The signal-sensing system is designed to require that the tubing pressure signal be present for a finite length of time before the casing pressure in chamber 25 is reduced to tubing pressure to permit upward movement of the motor 22. In order to accomplish this, gas rising through the communicator tube 33 passes into chamber 34 and is effective on pressure-responsive member 35. The gas must move the pressure-responsive member 35 from a first position, in which casing pressure is maintained in chamber 25, to a second position in which the chamber 25 is vented to tubing pressure. In order to give the system time to sense the tubing signal, means are provided to control the rate of movement of pressure-responsive member 35. Preferably, upward movement of the pressure-responsive member 35 is resisted by a body of liquid in the chamber 36 which must be moved through a rate control means 37. Chamber 36 forms a portion of a pressure chamber filled with incompressible fluid. This means for controlling the rate of movement of pressure-responsive member 35 may take any form. In the illustrative embodiment it is provided by the needle valve-controlled orifice 37. The needle valve 38 is adjusted so that the injection cycle of the valves below is shorter than the time required for pressure-responsive member 35 to force the fluid through the rate means and reach its second position. If the tubing signal reduces before this time, the tubing pressure entering through port 38 will reduce the casing pressure will move pressure-responsive member 26 up to seat valve 31 and stop the cycle.

Assuming that the signal is a true signal, the pressure-responsive member 35 moves upwardly until a shoulder 39 on the pressure-responsive member engages a shoulder 41 on the upper end of communicator tube 33. When this occurs, the tube is raised. It will be noted that at an intermediate point the tube is provided with a pilot valve 42 in seat 43. When the tube is raised and the valve 42 leaves its seat, the chamber 34 below the pressure-responsive member 35 is let into communication with the chamber 45 above the pressure-responsive member 26. At this time, casing pressure in chamber 25 flows through communicator tube 33, thence to chamber 34, through valve seat 43, to chamber 45, and out port 28 to the tubing. In this manner, the pressure above the motor piston 22 is reduced and the main valve is opened. Passageway 24 is smaller in size than all downstream passageways and provides a pressure drop.

Means are provided for controlling the rate of movement of the pressure-responsive member 35 downwardly to control the time during which gas will be injected. As this pressure-responsive member 35 moves downwardly, a shoulder 46 will engage the top of communicator tube 33 due to the action of spring 47. Upon the pressure-responsive member moving back to its first position, the valve 42 will again engage seat 43 blocking the flow of gas from chamber 34 into chamber 45. When this occurs, pressure will begin to build up in chamber 25 above the motor piston 22. This pressure will move the trigger valve 31 onto its seat and will seat the main valve. At this time, the tubing pressure will be dropping and the casing pressure will be sufficient to move the pressure-responsive member 26 upwardly with valve 31 on its seat to again unseat valve 42 and permit the pressure within chamber 34 under the pressure-responsive member 35 to reduce toward tubing pressure.

The rate of movement of the pressure-responsive member 35 is preferably controlled by movement of liquid through the partition 48. In addition to the pathway provided by the bleed 37, an additional needle valve-controlled passage 49 is provided. This passage is controlled by a check valve 51 so that it only permits movement of fluid from the chamber 52, which with chamber 36 provides the pressure chamber filled with incompressible fluid.

Another pressure-responsive member 53, which may be a bellowfram, forms a wall of the chamber 52 and tubing pressure is admitted through ports 54 to the upper face of this pressure-responsive member 53. The two pressure-responsive members 35 and 53 have the same effective pressure-responsive area, and therefore when the valve 42 is unseated to reduce the pressure in chamber 34 to tubing pressure, the same amount of pressure acts upwardly on the lower bellowfram 35 and downwardly on the upper bellowfram 53, and thus pressure on the fluid in the pressure chamber is balanced.

In order to move the lower bellowfram 35 downwardly, suitable resilient means are provided. Preferably, a pair of springs 55 and 56 urge bellowframs 53 and 35 downwardly. The combined force is exerted in a direction to move the lower bellowfram 35 downwardly to seat the valve 42. While a single spring could be utilized, a pair of springs, one acting on each bellowfram, is used so that the bellowframs will have equal life, as will be explained hereinbelow.

As mentioned above, upon reseating of valve 42, casing pressure builds up in chamber 34 until valve 31 seats. This positions the parts in the same position as when a false signal is sensed. At this time, the tubing pressure within chamber 45 would drop to a value below that which, with the force exerted by spring 29, would balance the force of casing pressure in chamber 25. This unbalance across the pressure-responsive member 26 would result in the pressure-responsive member moving upward to unseat valve 42 and return the pressure in chamber 34 to tubing pressure. Just before the tubing pressure reaches an amount sufficient to move the piston 26 downwardly and unseat ball 31, the valve would return to the position illustrated in FIGURE 3 with the valve 42 seated to commence a cycle of operation as hereinabove explained.

Figure 4A:
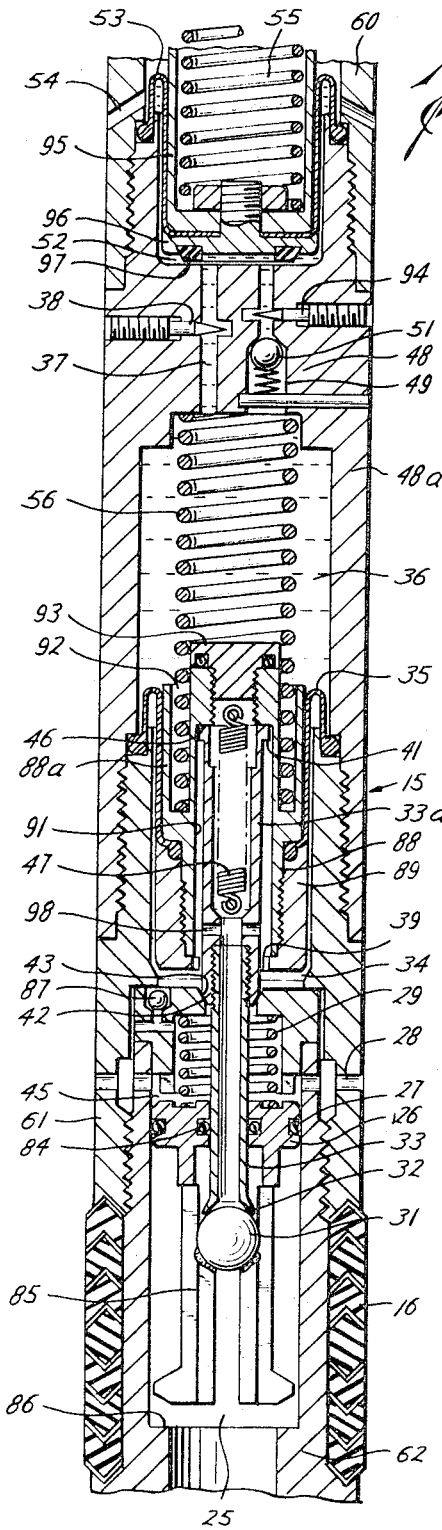
Figure 2:
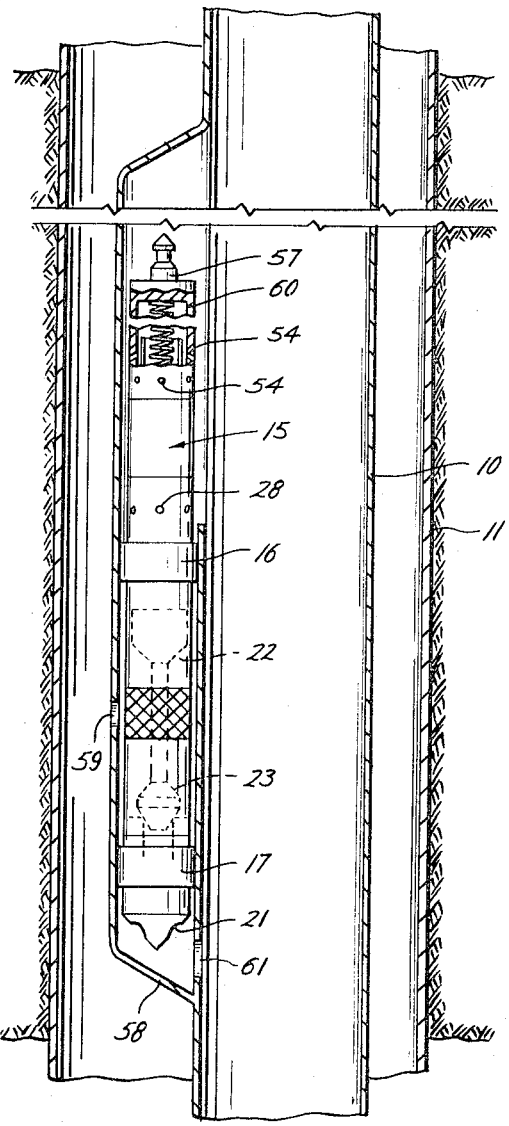
FIGURE 2 is a view partly in section, partly in elevation, and partly in phantom, showing the valve of this invention in a tubing in a well.

Referring now to FIGURES 2, 4A, and 4B, the preferred form of valve is shown. The upper end of body 15 terminates in a wireline fishing neck 57 for running and retrieving the valve in the usual manner. It will be noted that tubing 10 is provided with a conventional side pocket 58 having inlet port 59 and outlet port 61. The valve is run in the side pocket with the seals 16 and 17 sealingly engaging the side pocket in the customary manner. It will be noted that the ports 28 and 54 are located to have clear access to tubing pressure.

The body indicated generally at 15 includes the top closure 60 (the upper extremity of which is shown in FIGURE 1). A partition sub 48a which includes the partition 48 depends from the top closure 60. A control valve sub 61 depends from the partition sub. Continuing down the body, a motor valve sub 62 is secured to the lower end of the control valve sub. Secured to the lower end of the motor valve sub 62 is a main valve sub 63. The remainder of the valve body is made up of packing sub 64 and a lower closure 65.

A main gas passageway is provided through the valve by the inlet 19, the passageway section 18a above the valve, the passageway section 18b below the valve, and the outlet 21. The inlet 19 is protected against trash by a suitable screen 66.

The valve member 23 cooperates with valve seat 20 in the passageway to control the flow through the valve.

Opening and closing of the main valve 23 is controlled by the motor piston 22. This piston is connected to the main valve by a valve stem 67. This stem has a passageway 68 therethrough which includes the bleed section 24. Reverse flow through this bleed section is prevented by the check valve 69.

The motor is an improvement over the motor shown in the co-pending application of Lamb and Dudley Ser. No. 170,593, to which reference is made for a complete discussion of the motor. This valve follows generally the teaching of the Lamb and Dudley valve, but makes provision for sealing in both directions to prevent flow past the motor piston when the tubing pressure is greater than casing pressure. The valve stem 68 includes a stop 69 at its upper end against which a wedge member 71 may abut. The wedge member has a sliding seal with the piston provided by O-ring 72. The wedge member has a frusto-conical outer periphery 73 which cooperates with the inner wall of the annular seal member 22a. The seal member has an inner wall conforming to surface 73 and an outer cylindrical wall to engage cylinder 77.

Below the annular seal member 22a a seal stop 74 is provided on the valve stem. At the top of the piston, means are provided for urging the wedge downwardly. This means includes a spring 75 and a washer 76 which has a depending flange 76a engaging the upper surface of the wedge member 71.

While the main valve 23 is closed, casing pressure is present on both sides of the motor. When the pressure in chamber 25 is reduced to tubing pressure, the casing pressure acts on the lower end of the annular seal 22a forcing it upwardly against the wedge 71 which in turn is held against movement by the stop 69. It is noted that the wedge at its upper end has a maximum diameter which is subtstantially less than the diameter of the cylinder 77 with which the outer cylindrical wall of the seal cooperates to provide a space in which the seal is unsupported. This permits free movement of the annular seal along the wedge 79. The seal is made of polytetrafluoroethylene. The advantages of the use of this material are fully explained in the Lamb-Dudley application, and include a low coefficient of friction, ability to withstand high temperature and chemicals normally found in oil wells. Additionally, this material will mechanically absorb small particles by imbedding and will absorb impact without permanent deformation.

In the event tubing pressure is greater than casing pressure, the seal 22a will move down and engage stop 74. Pressure acting on the wedge ring and spring 75 will force the wedge ring down to engage the seal and wedge it firmly against the cylinder 77 to seal against pressure in this direction.

When the main valve is unseated, it opens with a snap action due to the bottom of the main valve 23 being suddenly exposed to casing pressure. The upward velocity is substantial and, to avoid damage, a buffer assembly indicated generally at 78 is provided. This assembly includes several sections of resilient material 79 separated by metal plates 81. By separating the resilient material and permitting each to act individually, it has been found that greater impact can be absorbed by a given body of material. The assembly includes a retainer 82 having a lower flange 82a which supports the bumper rubbers and plates aginst the shoulder 83 in sub 62. The entire assembly is held against the shoulder 83 by the spring 75.

In addition to holding the shoulder assembly in place, and holding the wedge 71 in contact with the annular seal 22a for reverse sealing, the spring 75 also functions to return the main valve to its seat when pressure across the motor 22 is equalized. Thus, spring 75 is a triple purpose spring.

Reference is now made to the means for opening and closing the main valve by controlling the pressure across the motor 22. This means in the form of valve illustrated includes the trigger means for initiating the cycle. Piston 26 has a sliding seal with the sub 62 in the form of an O-ring 27. A seal is also provided with the communicator tube 33 by an O-ring 34. Depending from the pressure-responsive member 26 are a plurality of stop lugs 85 which engage the shoulder 86 and limit downward movement of the pressure-responsive member or piston 26. The members 85 are spaced apart and have secured thereto as by welding the ball valve 31 which engages seat 32 at the lower end of communicator tube 33. The spring 29 urges the piston 26 downwardly and, when the combined force of spring 29 and tubing pressure exceeds casing pressure, the piston 26 moves down to unseat ball 31 and admit casing pressure into the chamber 34.

Casing pressure is held in chamber 34 by a check valve 87. This valve insures that tubing pressure will always be present in chamber 34 to protect the bellowfram 35.

The means for opening and closing the main valve 23 includes the pilot valve member or control valve member 42 formed on an intermediate section of the communicator tube 33. This valve cooperates with seat 43 to control the pressure within chamber 25.

The upper end of the communicator tube 33 is provided by a spring housing 33a which contains the spring 47.

The upper end of the spring housing has the flange 41 thereon for engagement by flange 39 to unseat the control valve 42.

The pressure-responsive member 35 is shown to be formed by a bellowfram. This form of pressure-responsive member is selected for its ability to permit substantial travel. One end of the bellowfram is clamped between the subs 48a and 61 and the other end is clamped between two parts 88 and 89 which provide a bellowfram closure and are part of the pressure-responsive member. The part 88 has a bore 91 for receiving the upper end 33a of the communicator tube and carries the shoulder 46 against which the tube abuts when the control valve 42 is off its seat. Additionally, the upper section 88a of this part has an annular slot 92 to support and guide spring 56. The outer periphery of this part 88a provides a support for the bellowfram 35. A suitable closure 93 makes the assembly pressure-tight. Thus, casing pressure in chamber 34 may move the pressure-responsive member 35 upwardly to unseat valve 42 and open the main valve.

The means for controlling the rate of travel of pressure-responsive member 35 includes the partition 48 having a bleed passage 37 therethrough. This passage is controlled by the adjustable needle valve 38. The adjustment of this bleed should be such that more time is required for liquid within chamber 36 to pass through the bleed passage 37 than is required for any valve therebelow to complete its injection cycle, that is, from the time the main valve opens until the main valve closes. This insures that the instant valve will not open in response to a false signal.

Also located in the partition sub is the passageway 49 controlled by the back-check 51 and needle valve 94. The back-check 51 makes this passageway inactive while fluid is being transferred from chamber 36 to chamber 52. However, upon the return of this fluid both passageways 37 and 49 are utilized and an additional adjustment is provided by needle valve 94 to permit adjustment of the injection time.

The upper pressure-responsive member 53 is also preferably a bellowfram held between the sub 48a and top closure 60. The free end of the bellowfram is clamped between the spring guide 95 and clamp 96. A seal 97, annular in form, is carried by the clamp 96 and surrounds the two passageways 37 and 49 to limit flow of fluid and downward movement of the upper bellowfram.

It might be noted that the spring 55, which is exposed to well fluids, is longer than spring 56 which is in an isolated chamber. This is due to the fact that different materials should be used in the springs to prevent weakening of the upper spring due to various substances present in the well. Preferably, the two springs have the same spring rate and exert the same force so that the same differential may be present across the two bellowframs, and they will have a substantially equal life.

Considering now the operation of the valve in detail, it will be assumed that a pressure of 1,000 pounds is present in the casing and a much lower pressure is present in the tubing. We can further assume that the area of the piston 26 is such that casing pressure will exert an upward force of 500 pounds across the piston. We may further assume that the spring 29 exerts a force of 150 pounds and that a casing pressure of 700 pounds would result in a downward force across the piston 26 of 350 pounds. Thus under the assumed pressure conditions, tubing pressure of 700 pounds is required to unseat ball 31. If we now assume that a valve below is the working valve, and the valve under consideration is a loading valve, it will be appreciated that each time the working valve admits gas a false signal will be sensed by each of the unloading valves. As gas is admitted to the tubing below and the column of fluid rises in the tubing, the pressure on piston 26 will increase. In the event this pressure is sufficient to overbalance the force of casing pressure, ball 31 will unseat and casing pressure will rise through bleed 24 and chamber 25 to the communicator tube 33, and thence through outlets 98 in the communicator tube into the chamber 34 and be effective on the lower bellowfram 35. The ball 31 will snap full open due to casing pressure becoming effective on the top of the ball.

The lower pressure-responsive member 35 will begin to rise at the rate controlled by the setting of the needle valve 38. This rise will be opposed by tubing pressure present on the upper pressure-responsive member 53 through ports 54. As the two pressure-responsive members are preferably of equal area, the driving force is the differential between the two pressures. Before the lower pressure-responsive member has reached a position in which flange 39 will engage flange 41, the slug of fluid rising in the tubing will have passed and the tubing pressure will fall off. As the pressure reduces, the piston 26 rises and reseats valve 31. This stops further upward movement of the two bellowframs. As tubing pressure further reduces, the casing pressure effective across the piston 26 and the area of the communicator tube 33 exerts a force greater than the tubing pressure and the piston 26 and ball 31 travel upwardly together. This unseats pilot control valve 42. Ball 31 will remain seated because of flared seat 32 providing an area exposed to casing pressure acting downwardly. With the control valve 42 unseated, the casing pressure in chamber 34 quickly reduces to tubing pressure and springs 55 and 56 return the bellowframs either to the position illustrated in the drawings, or near this position, depending upon tubing pressure. In any event, as tubing pressure rises to approach 700 pounds, this pressure and the spring 29 will move the piston 26 and ball 31 downwardly and the springs 55 and 56 will force the lower bellowfram 35 downwardly until the valve 42 seats. In this manner, a false signal will not result in opening of a valve.

If we assume that the valve is a working valve, and the signal is caused by a head of fluid standing in the tube above the valve, then the action described is the same except that the piston 26 stays in its down position and the bellowframs continue to move upwardly together. As the bellowfram moves upwardly from the position shown to the valve-opening position, the shoulder 39 engages shoulder 41 and lifts valve 42 from its seat 43. The spring 47 snaps the control valve to fully open position where the flange 41 is against the shoulder 46. When this occurs, pressure in chambers 34, 45 and 25 are reduced to tubing pressure because the bleed 24 is the smallest opening for flow of fluid from the casing through these chambers. The two springs 55 and 56, which preferably exert about a 30-pound force each, now begin to move the two bellowframs downwardly and force the liquid through the two passageways 37 and 49.

At the time that fluid in chamber 25 was reduced to tubing pressure, the motor 22 snapped the main valve off of its seat and the valve began the injection of gas into the tubing. The two bellowframs move downwardly at a controlled rate to permit the desired time of injection of casing gas into the tubing to pass. When this time has elapsed, the lower bellowfram seats the control valve 42 on its seat and casing pressure begins to build up in chamber 25 as well as in chamber 34. As pressure in chamber 25 moves the main valve 23 toward its seat, a differential begins to build up and the force of fluid rushing past the main valve snaps it to closed position.

This buildup of pressure in chamber 25 moves the piston 26 upwardly until the valve 31 engages its seat 32. In the meanwhile, casing pressure in chamber 34 has raised the bellowframs. However, tubing pressure is continuing to drop and will be low enough relative to casing pressure that the ball 31 and piston 26 will both move upwardly to unseat valve 42 again. At this time, casing pressure will exhaust from the chamber 34 and the bellowframs will slowly descend. As in the case of the false signal, the control valve 42 may seat or it may remain off its seat until tubing pressure builds up again to a value close to 700 pounds.

It might be noted that the arrangement of the two bellowframs and their associated structure, together with the rate control means, is such that the differential across the bellowframs will always be small. If we assume that a pressure of 700 pounds is present in the tubing and 1,000 pounds in the casing, there is present a total of 300 pounds difference. If each of the springs 55 and 56 exerts a force which is equal to 50 pounds of pressure, and the rate control means provides a 200-pound differential, then the pressures across the bellowframs are as follows: Below bellowfram 35, 1,000 pounds opposes 950 pounds in chamber 36. Due to the pressure drop across needle valve 38 of 200 pounds, the pressure in chamber 52 below the upper bellowfram is 750 pounds. Thus, the pressure differential across the two bellowframs will be 50 pounds each.

It might be noted that to further protect the bellowframs, the arrangement is preferably such that valve 42 is seated while the spring 55 still exerts its design force. This force will slightly collapse the bellowfram 35 and permit the downward movement of the upper bellowfram permit the seal 97 engages partition 48. This arrangement is preferred to insure that the valve 42 will be fully seated before downward movement of the upper pressure-responsive member is arrested.

The bellowframs are protected against excessively high pressure and the valve will not permit backflow of pressure. If we assume pressure to rise in the tubing to a value substantially equal to casing pressure, the valve will, of course, be open but stymied because no flow from casing to tubing will take place. However, when tubing pressure exceeds casing pressure, the tubing pressure will hold ball 31 off its seat and the higher tubing pressure will be effective on the motor 22 to hold the main valve seated. This will result because tubing pressure will be free to bypass check valve 87 and pass down through the tube 33 to be effective in chamber 25. As this tubing pressure will be equally effective on the two bellowframs with the incompressible liquid therebetween, the bellowframs will be protected against excessive pressures.

Reference is now made to FIGURE 4 which illustrates the ability of the valve to open when the selected casing-tubing pressure differential is present. Preferably, well fluids should be lifted when tubing pressure is in the neighborhood of 60% to 80% of the available casing gas pressure. Referring to the graph, the point 100 represents the unseating of valve 31 with relative tubing pressure and casing pressure as illustrated. The legend "time delay" indicates the movement of the lower bellowfram from closed to control pilot valve open position. At this time, the tubing pressure rises almost instantaneously and "injection time" represents the time when the main valve is open and gas is being injected. It will be noted that casing pressure drops during this time as indicated at 101. Upon valve 42 closing, tubing pressure falls off immediately as illustrated by the curve 102, and gas pressure rises as shown at 103. In the illustration, it is assumed that gas pressure rises to a higher value as indicated at 104. Inasmuch as the valve operates on a selected differential, the tubing pressure rises past the point where it previously began the operation of the cycle to a new trigger pressure point 105 which is a greater tubing pressure than that represented by point 100. Again, the same time delay occurs and tubing pressure rises almost instantaneously and is present during the predetermined injection time.

From a study of the graph, it will be apparent that the time cycle is begun at the time that tubing pressure rises to within a selected value of casing pressure. This means that unloading will always occur when the tubing pressure is at a selected pressure less than casing pressure and the efficiency of the system will remain high.

It will be appreciated from FIGURE 4 that the system cannot overload or underload, thus wasting gas. The system does not depend on a clock at the surface for injecting gas periodically, but injects gas only when needed because the timer is in the well and is not responsive to time but is responsive to a suitable column of oil being present in the tubing.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. In a gas lift valve comprising;
    a housing having a passageway therethrough;
    a main valve member and seat controlling flow through the housing;
    and a pilot valve for changing the pressure differential across a motor to open and close the main valve, said motor comprising,
    a cylinder in the housing,
    a piston rod connected to the valve member and movable in the cylinder,
    a stop on said rod,
    a wedge member having a frusto-conical periphery slidable on the rod and having its large diameter end engageable with said stop,
    seal means between the wedge and rod,
    an annular seal member formed of polytetrafluoroethylene with an inner frusto-conical wall to conform to the periphery of the wedge member and an outer cylindrical wall to conform to the wall of the cylinder,
    said wedge member at its largest diameter section in engagement with the seal being substantially less in diameter than the diameter of said cylinder, said seal member having its small area end unsupported to permit the seal to slide along the wedge member and be wedged between the wedge member and cylinder,
    a seal support on said stem limiting movement of said seal member away from said stop,
    and means urging said wedge toward said seal support.

2. In a gas lift valve comprising;
    a housing having a passageway therethrough;
    a main valve member and seat controlling flow through the housing;
    and a pilot valve for changing the pressure differential across a motor to open and close the main valve, said motor comprising,
    a cylinder in the housing,
    a piston rod connected to the valve member and movable in the cylinder,
    a stop on said rod,
    a wedge member having a frusto-conical periphery slidable on the rod and having its large diameter and engageable with said stop,
    seal means between the wedge and rod,
    an annular seal member formed of polytetrafluoroethylene with an inner frusto-conical wall to conform to the periphery of the wedge member and an outer cylindrical wall to conform to the wall of the cylinder,
    said wedge member at its largest diameter section in engagement with the seal being substantially less in diameter that the diameter of said cylinder, said seal member having its small area end unsupported to permit the seal to slide along the wedge member and be wedged between the wedge member and cylinder,
    a seal support on said stem limiting movement of said seal member away from said stop,
    a shoulder in said housing at the upper end of said cylinder,
    bumper means in said cylinder,
    and resilient means between said bumper means and said wedge member urging said wedge member toward said seal support and said valve member toward said seat and maintaining said bumper means against said shoulder.

References Cited by the Examiner
UNITED STATES PATENTS
3,121,442   2/1964   Lamb _____ 137—155
FOREIGN PATENTS
1,174,937   11/1958   France.

ALAN COHAN, *Primary Examiner.*